(12) United States Patent
Carter et al.

(10) Patent No.: US 7,493,908 B2
(45) Date of Patent: Feb. 24, 2009

(54) PROTECTIVE UMBRELLA FOR STROLLER

(76) Inventors: Philip R Carter, 188 E. 78th St., Apt. 21B, New York, NY (US) 10021; Jaime Nolan Carter, 188 E. 78th St., Apt. 21B, New York, NY (US) 10021

(*) Notice: Subject to any disclaimer, the term of this patent is extended or adjusted under 35 U.S.C. 154(b) by 0 days.

(21) Appl. No.: 11/336,157

(22) Filed: Jan. 20, 2006

(65) Prior Publication Data
US 2007/0251557 A1    Nov. 1, 2007

(51) Int. Cl.
*A45B 3/00* (2006.01)
(52) U.S. Cl. ............... 135/16; 135/25.4; 135/88.02; 135/33.2
(58) Field of Classification Search .......... 135/25.4, 135/96, 95, 120, 120.4; 297/188.06, 184.16
See application file for complete search history.

(56) References Cited

U.S. PATENT DOCUMENTS

| | | | | |
|---|---|---|---|---|
| 4,086,931 | A | * | 5/1978 | Hall ................. 135/98 |
| 4,919,379 | A | | 4/1990 | Goetz |
| 4,979,534 | A | | 12/1990 | Johnson et al. |
| 5,040,763 | A | * | 8/1991 | Wilson ............. 248/539 |
| 5,065,779 | A | | 11/1991 | Johnson et al. |
| 5,348,034 | A | | 9/1994 | Bulgatz |
| 5,368,055 | A | * | 11/1994 | Johnson et al. ....... 135/33.7 |
| 5,487,401 | A | | 1/1996 | Johnson et al. |
| 5,638,849 | A | * | 6/1997 | Scott ................ 135/96 |
| 5,673,888 | A | | 10/1997 | Garguilo |
| 5,752,534 | A | * | 5/1998 | Becher ............. 135/15.1 |
| 5,842,676 | A | | 12/1998 | Plzak |
| 5,921,258 | A | | 7/1999 | Francois |
| 6,173,724 | B1 | | 1/2001 | You |
| 6,244,557 | B1 | * | 6/2001 | Maze ................ 248/541 |
| 6,295,700 | B1 | | 10/2001 | Plzak |
| 6,314,976 | B1 | | 11/2001 | Clarke |
| 6,446,930 | B1 | | 9/2002 | Li |
| 6,561,178 | B1 | | 5/2003 | Hayes |
| 6,637,447 | B2 | * | 10/2003 | McMullin et al. ...... 135/16 |
| 6,889,699 | B2 | | 5/2005 | Clarke |
| 2001/0035202 | A1 | * | 11/2001 | Moskowitz et al. .... 135/16 |
| 2004/0222678 | A1 | * | 11/2004 | Hansen ............. 297/184.1 |
| 2004/0228118 | A1 | * | 11/2004 | Peterson ............ 362/102 |

* cited by examiner

*Primary Examiner*—David R Dunn
*Assistant Examiner*—Noah C Hawk
(74) *Attorney, Agent, or Firm*—Robert D. Katz; Cooper & Dunham LLP

(57) ABSTRACT

The invention provides an umbrella for attachment to a stroller that is large enough to protect the caregiver wheeling the stroller, carriage, or wheelchair from rain, wind and precipitation. The umbrella is wind proof, and attaches to the stroller by clamping its central shaft to the stroller. A counterweight is attached to the handle end of the central shaft. The umbrella has a double layered canopy that allows wind to pass through without inverting the umbrella, and may have a telescoping shaft to permit it to be stored compactly.

4 Claims, 2 Drawing Sheets

PROTECTIVE UMBRELLA FOR STROLLER

FIELD OF THE INVENTION

This invention relates to improved umbrellas, and more particularly to an improved umbrella that attaches to a baby stroller, baby carriage, or wheelchair to protect a caregiver wheeling the same from rain and precipitation, without requiring use of a hand to hold the umbrella.

BACKGROUND OF THE INVENTION

Baby strollers often come equipped with canopies and rain covers that protect the child quite well from precipitation, wind, and cold. The caregiver, however, often must hold an umbrella separately, in addition to pushing the stroller. Many strollers require two hands to steer properly, so a rainstorm, particularly one accompanied by strong winds, can provide a frustrating experience to the parent or other adult caregiver wheeling the stroller through inclement weather.

Other patents have discussed mechanisms for attaching an umbrella or parasol to a baby carriage or stroller. For example, U.S. Pat. No. 4,919,379 (Goetz) relates a clamping fixture for attaching umbrellas, parasols, sunscreens and the like to baby carriages or strollers. U.S. Pat. No. 5,673,888 (Garguilo) depicts a device for attaching an object to a support, which may include fixing an umbrella to a baby carriage. These devices do not address the problem of keeping the caregiver dry in a rainstorm, or the awkwardness of trying to push a stroller on a windy and rainy day, while holding an umbrella. Each of the foregoing references are incorporated by reference herein.

It is therefore an object of the invention to provide an umbrella that attaches easily to a stroller, baby carriage, or wheelchair to free the hands of the caregiver to push the same. It is a further object of the invention to provide an umbrella suitable for attachment to a stroller, baby carriage, or wheelchair that adequately protects the caregiver in hard rain, yet does not destabilize the stroller when the wind blows.

SUMMARY OF THE INVENTION

The objects of the invention are achieved and the disadvantages of prior devices are overcome by providing an umbrella for attachment to a stroller, comprising a wind resistant umbrella having a plurality of flexible ribs, a fabric cover attached thereto, a central shaft to which the ribs are attached at one end. The shaft has a counterweight attached to the other end, and a sliding locking mechanism for opening and closing the umbrella. A pair of straps wrap around and are clamped down to hold the central shaft against an upright or crosspiece on the stroller frame. The counterweight attached to the end of the central shaft counterbalances the weight of the umbrella as well as force exerted by wind on the umbrella when it is in an open position.

BRIEF DESCRIPTION OF THE DRAWINGS

The foregoing and other features and advantages of the invention will become apparent upon reading the following detailed description of the invention in conjunction with the attached drawings in which.

DETAILED DESCRIPTION OF THE PREFERRED EMBODIMENTS

Figure 1:
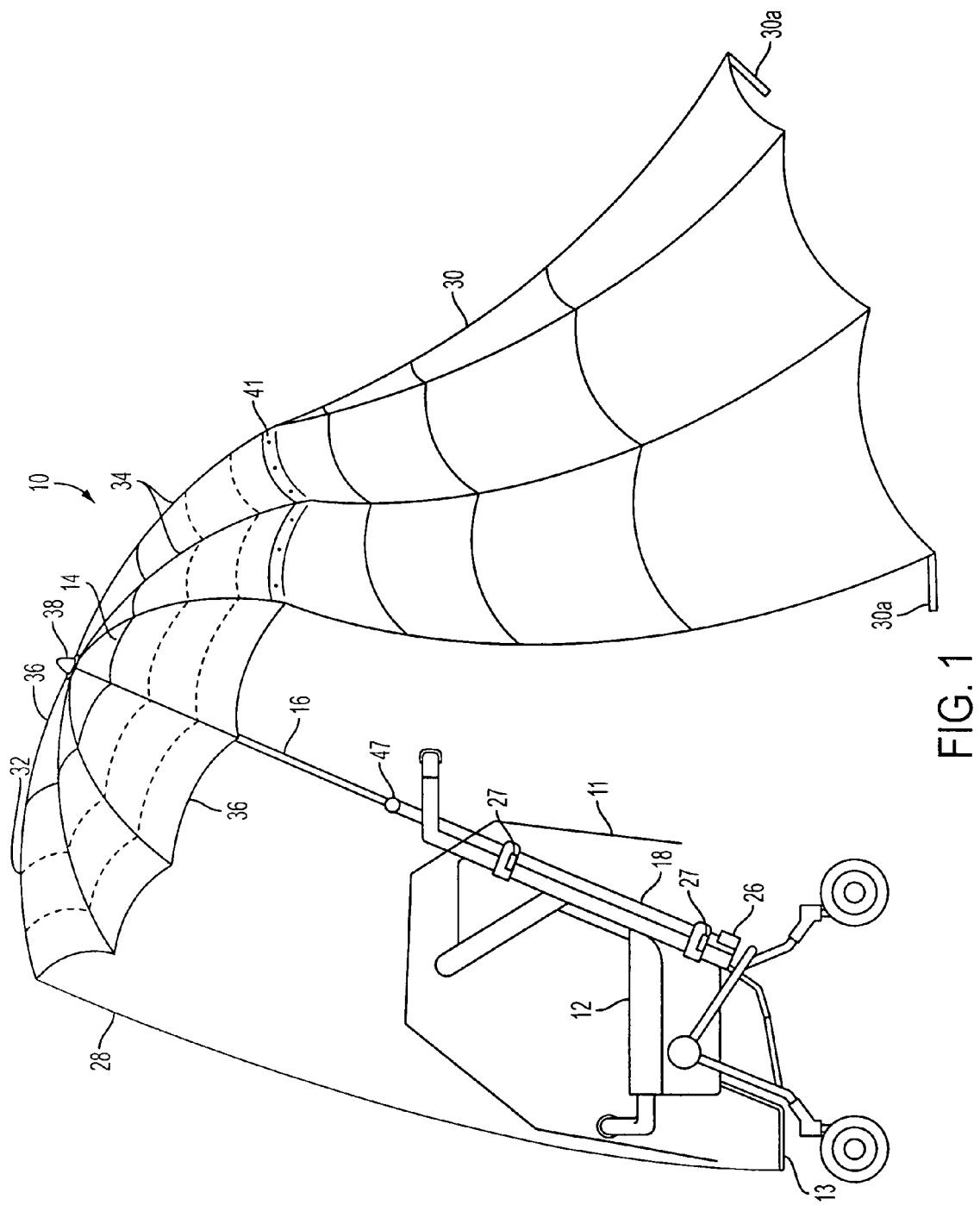
FIG. 1 is a side view of the stroller umbrella of the present invention.

Referring to the drawings, FIG. 1 depicts the stroller umbrella of the present invention, generally designated with the reference numeral 10, attached to a conventional folding or collapsible stroller 12. The stroller 12 seats a young child (not shown) who may be protected from rain, wind and cold by a conventional vinyl rain shield 11, commonly available from stroller manufacturers and retail stores carrying strollers and accessories. The umbrella 10, which may also attach to a pram, baby carriage, or wheelchair, includes a cover 14, a telescoping shaft 16 the bottom section 18 of which has an attached counterweight 26. A pair of straps 22, 24 wrap around the outer shaft that contains the umbrella 10 and fasten it to a portion of the stroller 12 frame, such as an upright. Of course, it may be adapted to attach to other portions of the stroller such as a cross-piece. One or more guy lines 28 help anchor the front of the umbrella 10 to the stroller 12. A rear flap or canopy 30 protects the caregiver from precipitation or runoff on their back.

Figure 2:
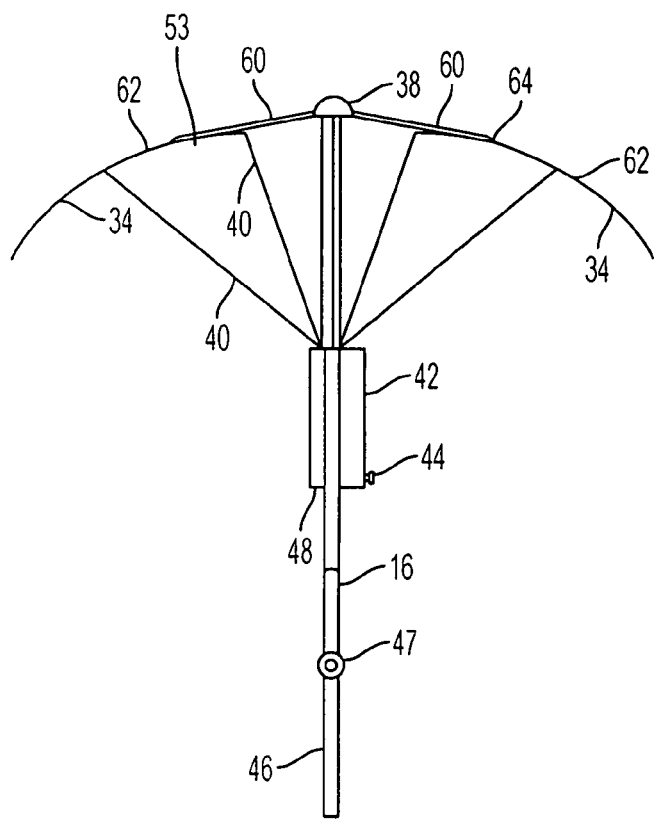
FIG. 2 is a side view of another embodiment of the stroller umbrella of the present invention.

The cover 14 includes a lightweight waterproof or water resistant material 32, such as nylon, vinyl, canvas or other similar water resistant or waterproof material 32 used in umbrella manufacture, which is sized and cut to provide a selected diameter for the particular umbrella. The umbrella 12 diameter should be selected to provide rain, wind and precipitation protection for an adult standing underneath. The material 32 is sewn or otherwise attached to a plurality of ribs 34, which form the frame 36 of the cover 14 of the umbrella 10. The ribs 34 can be flexible aluminum or steel, or other metal alloy, or a graphite reinforced composite, or any other strong material from which a sturdy, wind-resistant umbrella frame 36 is made. The ribs 34 extend axially from a central pivot or attachment point 38, as shown in FIGS. 1 and 2. The umbrella 10 includes a plurality of extenders 40 to open the umbrella 10. The extenders 40 are attached to an opener 42, which slides on the shaft 16, and help to push the extenders 40 and the ribs 34 outward. The opener 42 includes a button 44 which engages a slot or other opening 46 toward the bottom of the shaft 16 when the umbrella 10 is closed and a second slot or opening 48 adjacent the top of the shaft 16, when the umbrella 10 is open. The umbrella 10 may also be provided with a push button automatic opening mechanism. In such an embodiment, the user presses a button, such as button 44, and opener 42 slides up the shaft 16 toward pivot 38 forcing the extenders 40 upward, thereby opening the umbrella automatically, and holding it in an open or locked position. Such a feature provides an added measure of convenience, if desired.

Figure 3:
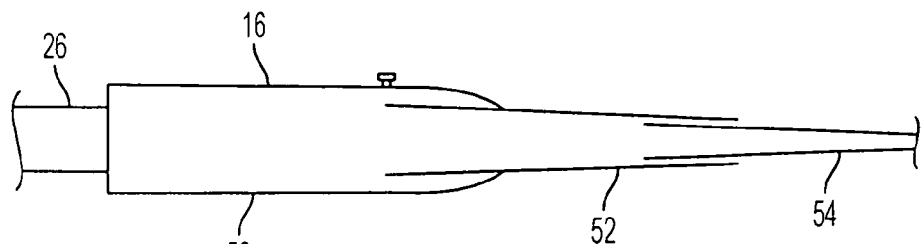
FIG. 3 is a side sectional view of the telescoping central shaft for use in the stroller umbrella of the present invention.

The shaft 16 is preferably segmented and telescopes, meaning that a number of segments slide along on another from a closed point to an open point to elongate the shaft 16 when extended, and to collapse the shaft 16 when not. As shown in FIG. 3, the shaft 16 includes a number of telescoping segments 50, 52, and 54. The first segment 50 has a counterweight 26 at one end and a diameter at the other chosen to capture the wide end of the segment 52. Segment 52 has a diameter at one end sized to be held within the end opening of the first segment 50 and an opening at the other end sized to capture an end of the third segment 54. This telescoping type of hollow shaft extension is well known in the art, and can be adapted for use with this umbrella. The umbrella also can have a push button automatic extension system for the shaft, the canopy or both. It may be accomplished using a first button to extend the shaft automatically, and a second button to extend the canopy, or a single button to extend both, using a conventional spring-loaded opening and closing mechanism for umbrellas.

In addition, the umbrella shaft should include a joint 47 (see FIG. 2) to articulate the shaft 16 so that the angle of the umbrella 10 can be adjusted to tilt as the user wishes, much as beach umbrellas articulate using a ratcheted or toothed joint in the umbrella pole.

The shaft 16 may preferably be made from a carbon or graphite composite, similar to that used to make shafts for golf clubs, in order to impart flexibility to the shaft 16 during windy rainstorms, but it may also be made of fiberglass, or titanium, steel, or aluminum alloys, or other material that has sufficient stiffness to act as an umbrella shaft 16, while providing sufficient flexibility to avoid wind damage, even in strong winds. A rubber grounding strap can be attached to the umbrella shaft to ground the umbrella in the event of a lightening storm.

The umbrella 10 should preferably be designed so that the frame 36 and cover 32 will not invert, even in a stiff wind. Umbrellas designed for golf or patio use often include this "wind proof" feature, and it may be accomplished in a number of ways well known to those of ordinary skill in the art. One way frequently used is exemplified by the Nike Wind proof 52 inch Golf Umbrella, available from Nike Sports, Beaverton, Oreg., or the Gustbuster 62 inch Style 5 Golf Umbrella, available from Innovention Enterprises, Farmingdale, N.Y. 11735. The umbrella 10 has a double canopy, shown in FIG. 2, with the uppermost portion 60 of the canopy overlapping the lower or outer portion 62 of the canopy, and providing a passageway 64 therebetween to allow wind to pass through the umbrella 10 without causing the umbrella to invert, and without allowing rain to drip on the user through the passageway 64. Details of the construction of the Gustbuster umbrella may be found in U.S. Pat. Nos. 4,979,534, 5,065,779, 5,368,055, and 5,487,401, all of which are incorporated herein by reference. The present invention, of course, is by no means limited to the foregoing umbrella design or configuration, as that is merely one example of how to provide an umbrella that resists wind inversion. Other types of umbrellas known to those of skill in the art could work equally well.

As mentioned above, the umbrella cover 14 may be made from a wide variety of materials that resist penetration by rain and other forms of precipitation. These include treated or untreated nylon, treated or untreated cotton canvas, thin flexible vinyl, parachute material, Gore-Tex material or Gore-Tex backed material, or other natural or artificial fabric, material, or composite woven material that sheds water, and does not absorb water. Available water proofing materials other than Gore-tex may also be used. Preferably, treated or untreated lightweight, tightly woven nylon fabric should be used because it is relatively inexpensive, durable, strong, waterproof, and wind resistant. It can easily be cut to the proper size and sewn or otherwise securely attached to the umbrella ribs 34.

The umbrella 10 may have an optional rear flap 30 attached to the umbrella cover 14 using metal or plastic snaps 40, Velcro, buttons, a zipper or similar commonly available fabric attachment means. The rear flap 30 keeps rain and other forms of precipitation off the caregiver. Its size in length and width is a matter of design choice. It can also be omitted altogether, or provided as shown in FIG. 1, for easy removal by the owner or user. It may be made of the same or of a different material as the umbrella 10 itself, or it can be made of a transparent material, such as clear vinyl, if desired. The rear flap 30 may have a pair of straps 30a at the bottom to attach the rear flap 30 to the legs of the user or to the sides of the stroller 12, to prevent it from being blown around in a strong wind.

The umbrella 10 is anchored to the front of the stroller 12 with a guy line or a pair of guy lines 28. The guy lines 28 may be, for example, two relatively thin straps or cords of nylon or other similar material that fasten or tie to the stroller 12, for example, underneath the foot rest 13 of the stroller 12. Each guy line 28 may also tie to one of the structural tubes on each side of the stroller 12, or they may tie or join together underneath the foot rest of the stroller, using snaps, Velcro, or another strong closure system, well known in the art. The guy lines 28 serve to hold the umbrella 10 in place over the stroller 12, in an upright position so that it covers and protects the caregiver, even when the wind is blowing, and would otherwise tend to tip the umbrella 10. There can also be a single guy line 28 also made from a nylon strap or made from a rubberized or elastic rope-like material that stretches to wrap around the foot rest of the stroller. An optional front flap of clear plastic, such as a clear sheet vinyl material (not shown) may be attached to the front of the umbrella, to protect the caregiver from driving rain, or the umbrella can have a deep mushroom shape to maximize its ability to shelter the caregiver from the rain.

Figure 4:
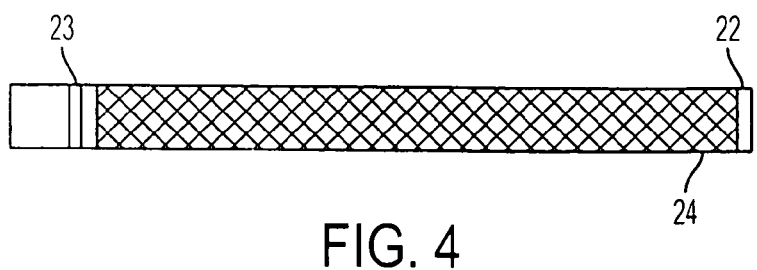
FIG. 4 is a front view of a strap and buckle for use in affixing the umbrella to the stroller frame.

The central shaft 16 is affixed to the frame of the stroller preferably using a nylon mesh belt and buckle or other fastener, similar to that used to strap a golf bag to a cart. This means for affixing the umbrella tightly or rigidly to the frame holds the lowermost segment of the central shaft 16 of the umbrella rigidly to the frame of the stroller 12 or carriage. Preferably, the strap 22 wraps around the frame member of the stroller and the shaft 16. The strap 22 fits into a buckle 23 as shown in FIG. 4. The buckle 23 may be metal or may be plastic, such as available from Design Research and Development Corporation, King of Prussia, Pa., as the Load Lock Fastener, see U.S. Pat. Nos. 6,295,700 and 5,842,676, which are incorporated herein by reference. Alternatively, a pair of clamps 27 can be used to affix the shaft 16 to the stroller 12. One clamping portion grips the stroller frame while the other grips the shaft 16 of the umbrella 12. The clamps 27 are tightened to hold the umbrella 12 and the stroller frame tightly.

A counterweight 26, such as a plastic or rubber covered lead or other heavy metallic weight, attaches near the bottom of the tube 18 to counterbalance the weight of the umbrella 10, and to prevent the stroller 12 from being lifted or toppled by the wind. The exact size and weight of the counterweight 26 depends on the size of the umbrella 14, the stroller 12, the weight range of the child (not shown), and the degree of wind resistance desired. For example, some golf umbrellas are 52 to 62 inches or more in diameter, and are tested to withstand wind gusts of 50 miles per hour or more. The counterwieght should be sized to counterbalance an umbrella of that size and weight, assuming that the umbrella is attached to a stroller weighing between about 10 and 20 pounds with a 10 to 50 pound child in the stroller. A person of ordinary skill can make such a determination, and calculate the required size and weight of the counterweight.

Whatever its size, the counterweight 26 can be permanently affixed to the end of the shaft 16 by a bolt through the counterweight 26 and the shaft 16, for example, or it can be attached to the umbrella shaft 16 by threading the counterweight 26 onto complimentary threading on the edge of the shaft 16, or with a bayonet-type or other mounting means that realeasably fastens the counterweight 26 to the shaft 16. For safety's sake, the umbrella-stroller combination should be tested in a wind tunnel or in actual wind conditions to demonstrate that the stroller with the umbrella attached there to have adequate stability to keep the child and the caregiver safe. The ability of the umbrella 10 to allow even strong winds to pass through, and of the pole or shaft 16 to flex in a strong wind minimizes the size of the counterweight 26 that must be added to counterbalance the umbrella.

The umbrella 10 may be provided as a kit that includes a bag or other cover (not shown) to hold the various parts, including the collapsed umbrella frame, shaft and cover, the counterweight, the attachment tube and clamps, and rear flap or canopy.

The installation and use of the stroller umbrella 10 of the present invention should now be readily apparent to a person of ordinary skill in the art. The user firsts sets up the stroller 12, preferably without the child and indoors where there is no wind. The user clamps the telescoping shaft 16 to the stroller frame. He or she then attaches the counterweight 26 to the shaft 16 by screwing one onto the other, or using the bayonet lock provided to keep the umbrella 10 from being lifted from the tube 18, unless the counterweight 26 is permanently affixed to the shaft 16. Next, the caregiver opens the umbrella 10, and attaches the back flap 30, if desired, and then closes the umbrella 10. The child sits in the stroller seat, is belted in position, and then is wheeled outdoors, where the umbrella can be opened. The rear flap 30 is unfurled, and adjusted. The caregiver is then free to push the stroller 12 and pay attention to the child therein, and the street or obstacles ahead, without being distracted by the necessity of balancing a cumbersome and large umbrella while trying to wheel the stroller, watch the child, avoid the rain, and look out for traffic, road hazards, other pedestrians, and the like. The clamps 22, 24 may be left on the frame of the stroller, if desired, so that only the umbrella 10 and counterweight 26 have to be attached during inclement weather. The clamps 22, 24 are sized and positioned so that they do not interfere with opening, closing, folding or normal operation of the stroller 12. For those strollers that have an integral or attached platform over or adjacent the rear wheels to accommodate another child as a rider, the umbrella of the present invention will keep precipitation off the second child in addition to the caregiver.

It should be appreciated that an umbrella that attaches to a stroller to provide protection for the caregiver has been described, with reference to preferred embodiments illustrated in the accompanying drawings, but that other modifications may be made to this preferred embodiment. It will be appreciated that the present invention is not limited to those precise embodiments, and that various changes and modifications maybe made thereto by one of ordinary skill in the art without departing from the scope or spirit of the invention, which is defined in the following claims.

The invention claimed is:

1. An umbrella for attachment to a stroller or carriage, comprising:
 a wind resistant umbrella having a plurality of flexible ribs, a fabric cover attached thereto, the cover having two layers forming an upper and lower canopy defining a wind vent therebetween, a flexible central shaft of telescoping segments to which the ribs are attached at a first end of the shaft and a counterweight removably attached at a second end of the shaft, and a sliding locking mechanism for opening and closing the umbrella;
 a pair of clamps or belts to hold the central shaft substantially upright and immobile alongside a portion of the stroller or carriage frame;
 a rear flap extending downward from an outer edge of the umbrella, the flap having a pair of straps to attach the flap to a user's legs.

2. An umbrella as set forth in claim 1, wherein the cover is treated or untreated nylon, canvas, or vinyl.

3. An umbrella as set forth in claim 1, wherein the central shaft is fiberglass, a graphite or carbon-reinforced composite, steel, titanium, or a titanium alloy.

4. An umbrella as set forth in claim 1, wherein a pair of clamps grip a portion of the frame and the flexible shaft to attach the umbrella to the stroller.

\* \* \* \* \*

UNITED STATES PATENT AND TRADEMARK OFFICE
CERTIFICATE OF CORRECTION

PATENT NO. : 7,493,908 B2  
APPLICATION NO. : 11/336157  
DATED : February 24, 2009  
INVENTOR(S) : Philip Carter and Jamie N. Carter Page 1 of 1

It is certified that error appears in the above-identified patent and that said Letters Patent is hereby corrected as shown below:

Title page, item [76] should read:  
Inventors: Philip R. Carter and Jamie Nolan Carter Signed and Sealed this Fourteenth Day of April, 2009

JOHN DOLL  
*Acting Director of the United States Patent and Trademark Office*